United States Patent [19]

Longamore

[11] 3,790,155

[45] Feb. 5, 1974

[54] X-Y TABLE FOR VACUUM SYSTEMS

[75] Inventor: Robert Gail Longamore, Newbury Park, Calif.

[73] Assignee: Radiant Energy Systems, Inc., Newbury Park, Calif.

[22] Filed: July 17, 1972

[21] Appl. No.: 272,430

[52] U.S. Cl. .................... 269/60, 74/18.1, 108/137, 250/311, 269/73

[51] Int. Cl. .................... B23q 3/18

[58] Field of Search ....... 74/18, 18.1; 108/137, 138, 108/139; 250/311, 306, 307; 269/58, 60, 61, 62, 71, 73

[56] References Cited

UNITED STATES PATENTS

| | | | |
|---|---|---|---|
| 2,860,933 | 11/1958 | Wolff | 74/18.1 X |
| 3,638,933 | 2/1972 | Burnette | 269/60 |
| 3,702,399 | 11/1972 | Lucas | 250/311 |

*Primary Examiner*—Harold D. Whitehead
*Assistant Examiner*—Mark S. Bicks
*Attorney, Agent, or Firm*—Spensley et al.

[57] ABSTRACT

X-Y tables for use in a vacuum system whereby accurate two dimensional movement of a table within the vacuum system may be readily achieved in a repeatable and reliable manner without distrupting or contaminating the vacuum environment. The table within the vacuum system is mounted so as to be translatable in orthogonal directions and is coupled to an external drive system so as to be driveable by conventional means such as lead screws and the like. Integrity of the vacuum system is maintained by a bellows isolating the external drive system to the internal X-Y table, thereby eliminating the need for lubricants, small clearances and other sources of contamination within the vacuum system.

13 Claims, 5 Drawing Figures

X-Y TABLE FOR VACUUM SYSTEMS

BACKGROUND OF THE INVENTION

1. Field of the Invention.

The present invention relates to the field of translation devices for use with a vacuum system and particularly to translation devices for providing two dimensional translation of an article within a vacuum system in a simple, accurate and reliable manner.

2. Prior Art.

The present invention is suited for use in conjunction with a vacuum chamber wherein an object must be accurately and controllably translated in two orthogonal directions over a distance of more than one inch. The present invention is particularly suited for use in conjunction with electron beam pattern generators for the fabrication of masks used in the manufacture of integrated circuits. Such masks comprise a matrix of typically hundreds of highly accurate and detailed circuit patterns. The masks may be created by repeatedly projecting (electron image projection or electron beam scanning) the same circuit pattern while stepping the mask blank to a new position between each exposure. Therefore, the present invention and the prior art relating thereto shall be described in detail herein, it being understood that the present invention is not to be limited to this single use.

A conventional photomask used in integrated circuit fabrication processes is formed on a two inch by two inch glass plate, and therefore an X-Y table for use in a system for creating the photomasks should be capable of stepping to substantially any position within a two inch square range, and preferably within a somewhat larger range such as a three inch square range. The simplest method for achieving an accurate translational capability over such a large range is a lead screw system, or for two dimensional motion is a system comprised of two orthogonal lead screw systems so as to provide the two dimensional capability. Lead screw systems are relatively easily manufactured, provide good translational control and relatively fine resolution in position versus lead screw angle. Thus, in prior art electron beam systems, such as scanning electron beam microscopes, two dimensional lead screw tables driven by lead screws within the vacuum chamber are used. To avoid the necessity of providing a drive means, typically an electric motor together with reduction gears, etc., within the vacuum chamber, the drive means, including the reduction gear, is usually mounted external of the vacuum chamber and shaft rotation is coupled to the walls of the vacuum chamber by a rotary feed through device. Such devices, depending on the specific configuration used, may require lubrication and/or small clearances that require a long pump down time to evacuate, and tend to leak and/or have poor reliability and life so as to require frequent repair or replacement.

In order to fabricate photomasks of the highest quality with an electron beam pattern generator, the system should be operated in a vacuum on the order of $10^{-6}$ to $10^{-9}$ torr. Thus, all components used within the vacuum system must be compatible with such vacuum levels. Specifically, the materials and the design of devices used within the vacuum chamber must be selected so as to not significantly outgas at these pressure levels, and preferably allow for relatively rapid pump down to these levels so that the system may be put in an operative state as quickly as possible after it has been exposed to higher pressure levels. Thus, lubricants such as oils and the like cannot be used in the vacuum chamber. Also, mechanical structures having trapped air pockets, small gaps, or other regions communicating with the vacuum through any form of restricted communication is to be avoided if at all possible since even a relatively small region may trap enough gas at a fraction of an atmosphere pressure to prevent the pump down of the system to the desired levels until substantially all of the trapped air leaks out, a process which may take a matter of hours or longer.

Scanning electron beam microscopes known in the prior art have commonly operated at higher pressure levels than heretofore mentioned, and therefore lead screw assemblies within the vacuum chamber could be tolerated. However, lead screw assemblies, when used in an electron beam pattern generator at the preferred vacuum levels for such equipment, create mechanical problems of lubrication and operation, and cause intolerably long pump down times after exposure to higher pressures. Furthermore, since the attainment and maintenance of the desired vacuum levels is achieved through the use of ion pumps, outgasing sources within the vacuum chamber greatly effect the ion pumps life and pumping efficiency. Thus, there is a need for a simple, reliable and accurate means for providing an X-Y movement capability over a range of a matter of inches within a vacuum system which is both vacuum compatible and easily controlled.

BRIEF SUMMARY OF THE INVENTION

An X-Y table for use in a vacuum system whereby accurate two dimensional movement of a table within the vacuum system may be readily achieved in a repeatable and reliable manner without disrupting or contaminating the vacuum environment. The table within the vacuum system is mounted so as to be translatable in orthogonal directions through a system of linear ball bearings, and is coupled through a pivoting member to an external drive system so as to be driveable by conventional means such as lead screws and the like. Integrity of the vacuum system is maintained by a bellows isolating the external drive system from the internal X-Y table, thereby eliminating the need for lubricants small clearances and other sources of contamination and outgasing within the vacuum system while allowing the free use of substantially any desired lubricant within the lead screw assemblies and associated drive systems. The single bellows minimizes the opportunity for leakage and resists any rotational forces which may be applied to the table.

DETAILED DESCRIPTION OF THE INVENTION

Figures 1, 2, 5:
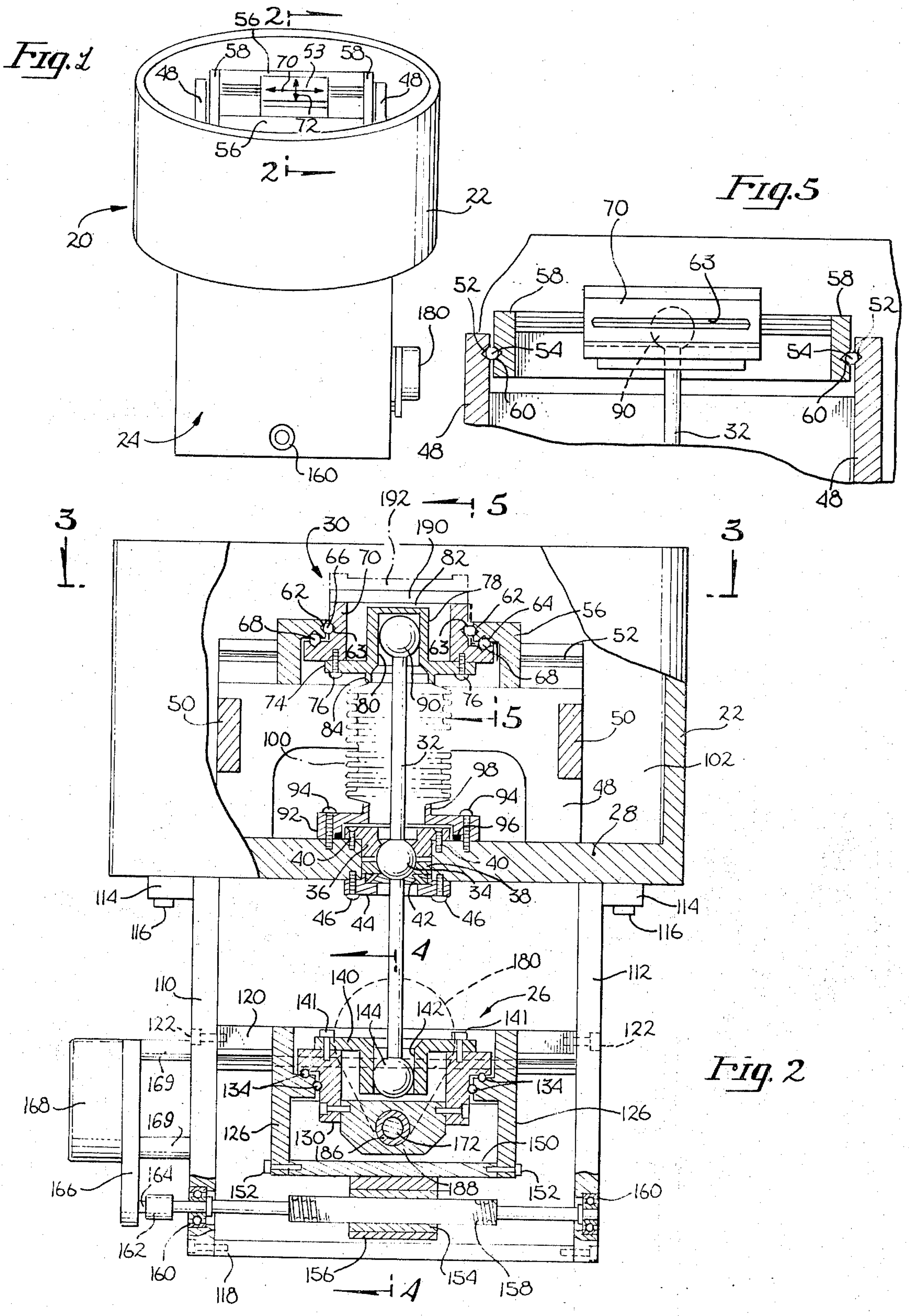
FIG. 1 is a perspective view of the lower portion of a vacuum system showing the present invention mounted thereon.
FIG. 2 is a cross section taken along lines 2—2 of FIG. 1.
FIG. 5 is a partial cross section taken along lines 5—5 of FIG. 2.

First referring to FIG. 1, a perspective view of an assembly generally indicated by the numeral 20 containing the present invention X-Y table may be seen. The assembly 20 in this embodiment is specifically adapted to form the lower portion of a vacuum chamber of an electron beam pattern generator, such as the type disclosed in a co-pending patent application entitled "Electron Beam Pattern Generator," Ser. No. 244,078, filed Apr. 14, 1972, by William R. Livesay, and assigned to the same assignee as the present invention. In that application, an electron beam pattern generator is disclosed wherein one of the components of the system is an X-Y table adapted to hold and translate on command, a mask or target in either or both orthogonal directions in the plane of the target. Other systems are also known which require a two dimensional translation of an article in a vacuum chamber. Thus, the cylindrical member 22 is adapted to connect to, or be an integral part of, a complete vacuum enclosure thereabove (not shown in FIG. 1), with the cylindrical member 22 and the base thereof, as shall be subsequently more fully described, forming the lower automatically sealed portion of the vacuum chamber. Mounted below member 22 is an assembly, generally indicated by the numeral 24, comprising the portion of the mechanical assembly of the present invention located outside the vacuum system.

Now referring to FIG. 2, a partial cross section taken along lines 2—2 of FIG. 1 may be seen. The X-Y table is basically comprised of a dual X-Y translating system. A first X-Y translating system, generally indicated by the numeral 26, together with a lead screw drive system therefor, is located below the high vacuum area bounded generally by the cylindrical chamber 22 and the base 28 thereof, and a second X-Y repeating translational system generally indicated by the numeral 30, is generally disposed within the vacuum system. A "wobble" member 32 has a spherical center region 34 which is disposed between mating members 36 and 38 so as to be capable of pivoting in all directions within members 36 and 38. Member 36 is fastened to the base 28 by screws 40, while member 38 slidably fits within the bore of base 28. A conically shaped washer 42, commonly referred to as a Belville washer, is entrapped between lower member 44 and sliding member 38 so as to elastically encourage member 38 upward toward member 36 and to entrap spherical member 34 therebetween to prevent any looseness in the support of the spherical member. Member 44 is, in turn, fastened to base 28 by screws 46.

Fastened to the base 28 and extending upward therefrom in the vacuum chamber are a pair of parallel members 48 which are maintained in parallel spaced apart relation by transverse members 50. Adjacent the top of members 48 and facingly disposed are raceways 52 which may be better seen in FIG. 5. These raceways are comprised of parallel co-planar V-shaped notches adjacent the top of members 48 adapted to receive a plurality of balls 54 therein. The balls themselves may be best seen in FIG. 3 which is a top view of the apparatus of the present invention shown in FIG. 1. A carriage assembly comprised of transverse members 56 and members 58 having cooperatively disposed parallel raceways 60 is disposed between members 48 so as to allow the carriage assembly to roll on balls 54 in a direction generally indicated by the arrow 53 in FIG. 3. Members 56 and 58 are preferably joined by countersunk screws disposed so as to not interfere with the raceways and the rolling of the balls therein, which screws, for purposes of clarity, have not been shown in the drawings.

Transverse members 56 have opposingly facing sections having parallel V-shaped raceways 62 and 64 receiving a plurality of balls 66 and 68. Member 70 similarly has cooperatively disposed V-shaped raceways so as to entrap the balls 62 and 64 between member 70 and the parallel members 56 so as to allow the free translation of member 70 in the direction indicated by the arrow 72 in FIG. 3. Thus, it may be seen that member 70 may translate in a first direction with respect to the carriage assembly comprised of members 56 and 58, and the entire carriage assembly including member 70 may translate in a second direction, orthogonal to the first direction, with respect to members 48. Therefore, member 70 is free to move in any desired direction with respect to the vacuum chamber enclosure 22.

A member 74 is attached to the lower surface of member 70 by screws 76 and is characterized by an upward projecting section 78 having a polished cylindrical bore 80, a top closure member 82 integral with or at least sealably attached to the top of member 74, and a slight downward projecting cylindrical lip 84. The upper portion of shaft 32 has a spherical member 90 at the upper end thereof slidably engaging the cylindrical bore 80 so as to be free to move up and down in the bore but to encourage the member 70 to translate in response to lateral forces transferred thereto from the spherical member 90. A member 92 is fastened to the base 28 of the vacuum chamber by screws 94 and is sealed along its mating surface with base 28 by an O-ring 96. Member 92 has an upward projecting cylindrical lip 98 similar to the downward projecting lip 84, and a bellows 100 is sealably affixed to the cylindrical sections 84 and 98 so as to provide flexible coupling therebetween which is virtually leakproof between its inner diameter and its outer diameter. Thus, it may be seen that the high vacuum, generally in the region 102, is generally limited to the region internal to the cylindrical chamber 22 and above base 28, and is further restricted from the area of shaft 32 as a result of member 74 (which is closed at the top thereof) and bellows 100, with leakage of air radially outward between base 28 and member 92 being restrained by the O-ring 96. In this regard, the drill holes for mounting screws 94 for member 92 should be blind holes and not project through the base 28 so as to eliminate any possibility of leakage of air upward through the screw holes from the region of atmospheric pressure below base 28. It is to be noted also that since spherical member 34, as well as spherical member 90, operate in regions of atmospheric pressure and not in a vacuum, these members may be well-lubricated, preferably with a suitable grease, such as a thixotropic grease so as to be self-retaining in the desired location, minimize wear and to effectively eliminate any tendency of slight looseness in the mating of spherical member 90 with member 74. In this regard, it should be noted that cylindrical bore 80 may be readily cut, ground and polished to a high degree of accuracy, and balls of various graded sizes and of various materials having accuracies of a new millionths of an inch are commercially available at a relatively low price. Therefore, a freely sliding, yet substantially slop-free fit between spherical member 90 and the cylindrical bore 80 may be relatively easily achieved, either by fabricating a one piece shaft 32 with the spherical members ground and polished thereon or assembled by using a shaft and mounting commercially available balls thereon.

Figure 3:
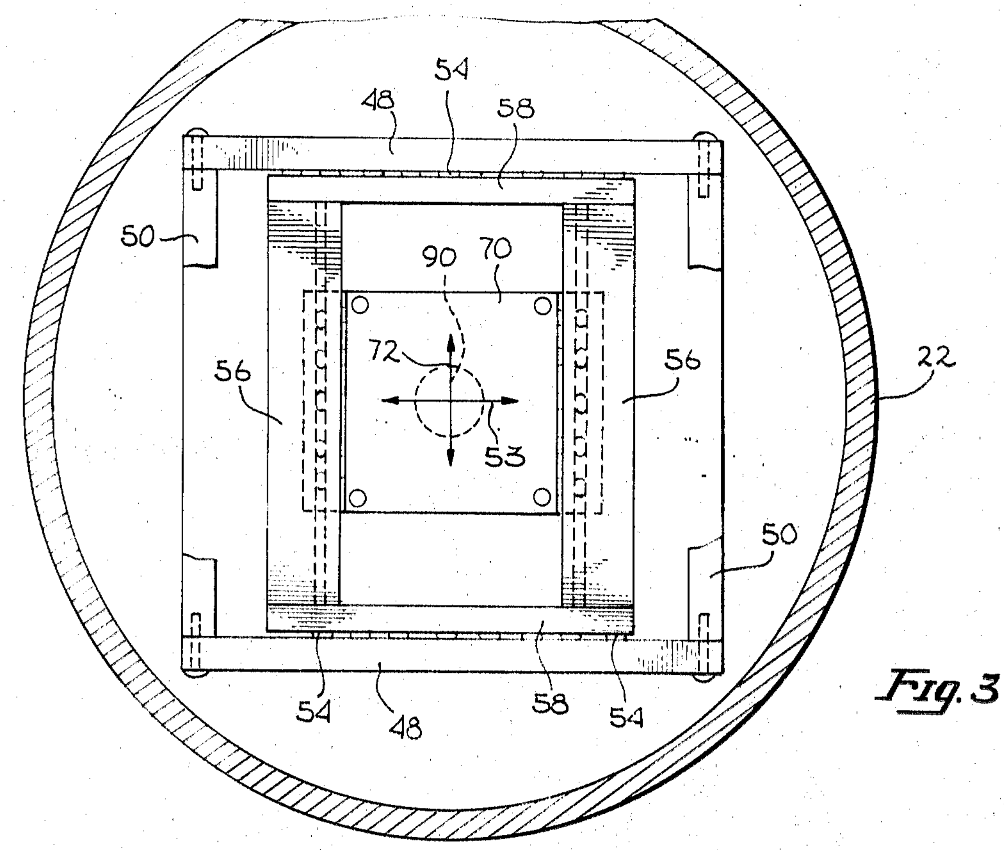
FIG. 3 is a cross section taken along lines 3—3 of FIG. 2.

It will be noted from both FIG. 3 and FIG. 5 that the ball tracks or raceways in one member are longer than the ball tracks in the adjacently disposed cooperating member and, in general, the ball tracks in the moving member are substantially shorter than in the member which is stationary, at least relative thereto. Therefore, in order to prevent the inadvertent passage of balls out from between the facingly disposed raceways, the shorter raceway is bounded at the ends thereof so as to interfere with the free passage of the balls thereby. By way of example, one of raceways 63 in member 70 may be seen wherein the raceway terminates just short of each end of the member. This result may be readily accomplished as shown in FIG. 5 by not cutting the raceway along the full length of the member, or as an alternative, by cutting the raceway the full length of the respective members and then obstructing the very ends thereof by a separate member attached to the member carrying the raceway. As an alternative, the raceways in both members may be approximately the same length and each closed or bounded at each end, with a full compliment of balls (or a lesser number of balls and a ball retainer) having a length shorter than the raceway by at least one half of the table travel, so as to provide both confinement and the desired free rolling of the balls.

Figure 4:
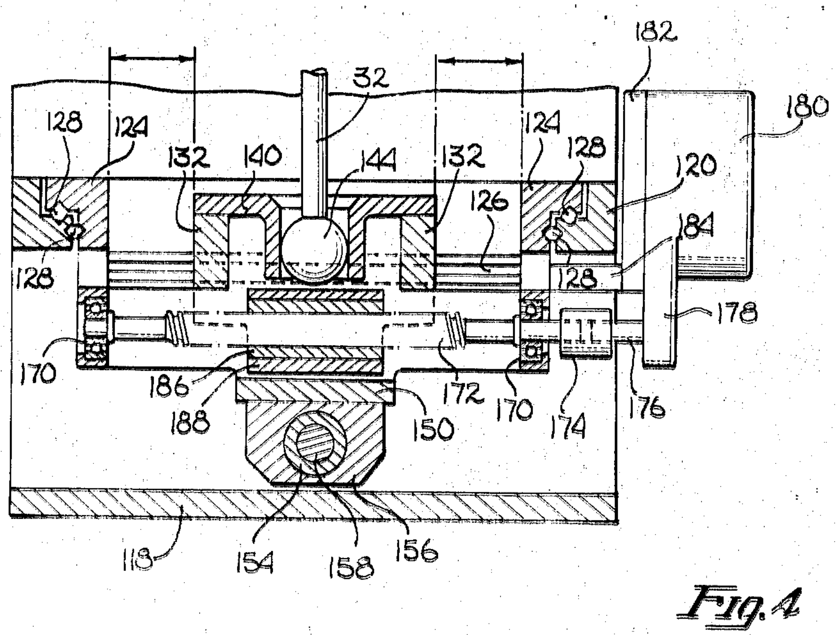
FIG. 4 is a partial cross section taken along lines 4—4 of FIG. 2.

A pair of side plates 110 and 112 each have a flange member 114 welded thereto. The flange members 114 are bolted by means of bolts 116 to the base 28 of the vacuum chamber using blind drill holes to avoid disturbing the integrity of the vacuum chamber enclosure. A bottom structural member 118 is bolted to each side plate adjacent the bottom thereof so as to rigidify, and maintain the desired spacing of the side plate. A pair of rail members 120 are also bolted by means of bolts 122 between the two side plates. The rail members 120 may be better seen in FIG. 4 which is a cross section taken along lines 4—4 of FIG. 1. A pair of members 124 are cooperatively disposed with respect to rail members 120 and are maintained in the desired parallel spaced apart relationship by members 126 (FIG. 2) which are attached between the ends of members 124 to form a basic box construction. A pair of facingly disposed raceways in each of members 120 and 124 has a plurality of balls 128 therein to provide for the free rolling of the assembly, including members 124 and 126, in a direction parallel to the ball tracks. Members 126 in turn each have a pair of raceways therein cooperatively disposed with respect to the raceways on members 130, again comprising a part of a box or square structure, with members 132 providing the other two sides of the square structure. A plurality of balls 134 thus provide for the free movement of the assembly including members 132 and 130 in a direction parallel to the respective ball tracks, thus, providing motion in a direction orthogonal to the motion provided by the ball track in members 120 and 124.

In general it may be seen that the motion of the assembly comprising members 130 and 132 with respect to the fixed structures, such as side plates 110 and 112 may be in any selected direction, thereby providing an X-Y translating system below the vacuum chamber in addition to the translating system provided within the vacuum chamber. Since the construction of this second translating system is substantially the same as the construction of the system within the vacuum chamber, specific details regarding the fastening of the various parts, etc. will not be again repeated.

A member 140 is attached by screws 141 to members 130 and is characterized by a downward projecting cylindrical bore 142 receiving spherical member 144 in much the same manner as heretofore described with respect to the upper portion of shaft 32. Thus, it may be seen that any motion of the assembly comprised of members 130 and 132 (as well as member 140) will cause shaft 32 to appropriately pivot about the center of spherical member 34 and in turn force a tracking of the translation system within the vacuum chamber, causing that system to accurately translate an equal amount (but in an opposite direction). The resulting angularity or deviation of shaft 32 from the vertical direction results in the parallel translation of the top of bellows 100 with respect to the bottom of the bellows. However, since a relatively long and flexible bellows is used, the resulting motion does not exceed the elastic limits of the bellows. (It is to be noted that the periphery of the bellows is exposed to the high vacuum whereas the internal cavity of the bellows is exposed to atmospheric pressure so that the differential pressure is in a direction to prevent the collapse of the bellows, thereby allowing a choice of bellows thickness based on cost and flexibility considerations).

Members 126 project downward with a plate 150 being attached adjacent the bottom and between these members by screws 152. A lead screw nut 154 within a mounting block 156, both of ordinary construction, is fastened to member 150, with a lead screw 158 extending therethrough and being supported adjacent each end thereof by a ball bearing 160 appropriately mounted to each of side plates 110 and 112. The lead screw shaft extends through the ball bearing in side plate 110 and is attached by coupling 162 to a shaft 164 driven through a reduction gear assembly 166 by a motor 168 bolted to side plate 110 through spacers 169. Thus, motor 168 will cause the rotation of lead screw 158 thereby resulting in the translation of both the lower translation system and the upper translation system in a first of two orthogonal directions.

In a similar manner, members 124 extend downward (FIG. 4) to provide a support for the ball bearings 170. A lead screw 172 is supported by the ball bearings with the lead screw shaft extending through one of the ball bearings so as to be driven to coupling 174 and shaft 176 by the reduction gear assembly 178, which in turn is driven by a second motor 180. Motor 180 is supported through a spacer 132 by a member 184 bolted to and extending between members 126. The lead screw 172 is supported above the lead screw assembly comprised of the lead screw 158 and the lead screw nut assembly thereon and engages a similar screw nut assembly comprised of lead screw nut 186 and support therefore 188, with the support 188 being fastened by screws to members 130 (FIG. 2). Thus, it may be seen that motor 180 and the lead screw 172 driven thereby will result in the translation of the assembly comprised of members 130 and member 140 in the second orthogonal direction, with the motor and lead screw assembly being translated in the first orthogonal direction by motor 168 and the lead screw assembly driven thereby. Thus, it may be seen that member 140 engaging the spherical member 144 on the bottom of shaft 32 may be driven in a first direction by motor 168 and driven in a second orthogonal direction by motor 180 or, of course, in any combination of these directions, with the motion being transmitted to the translation system within the vacuum chamber as a result of the assembly heretofore described.

It is to be noted that all of the lead screw assemblies, motors and ball socket joints are exposed to atmospheric pressure and may be lubricated by any suitable lubricant without effecting the integrity of the vacuum, with the only mechanical element within the vacuum chamber being a plurality of balls on which the various members may be translated and, of course, suitable structural elements which may include a base plate 190 and a special support plate 192 to receive the particular article to be supported on the X-Y table of the present invention. Either a full compliment of balls may be used in the various assemblies, or a ball separate of conventional construction may be used, such as a strip of brass with a plurality of spaced holes therethrough to fit between the two members defining the raceways confined in the balls and to receive the balls in the holes.

There has been described herein a translation system for use in a vacuum environment which is capable of accurately controllable motion in two orthogonal directions and which is compatible with substantially any desired vacuum level. The system uses commercially available components and/or readily fabricated parts, all to result in a translation system having substantially all moving members and mechanical assemblies mounted external to the vacuum system. A single bellows is used to isolate the mechanical assembly from the vacuum system as a result of the hermetic attachment of the bellows at each end thereof. The use of a single bellows as in the present invention minimizes possible causes of leakage. Of course, the lower lead screws could be turned by stepper motors, or other drive means, and the entire lead screw assemblies replaced with other linear or substantially linear actuators such as, by way of example, linear stopper motors. Similarly, position sensing devices could be used either with respect to lead screw angle or with respect to substantially any moving component of the translational system so as to provide an accurate read out of the position of the table. Similarly, the various bearing arrangements could be altered as required for a specific application. Thus, while the invention has been particularly shown and described with reference to preferred embodiments thereof, it will be understood by those skilled in the art that various changes in form and details may be made therein without departing from the spirit and scope of the invention.

I claim:

1. A means for providing two dimensional translation within a chamber comprising:

a first means mounted within said chamber, and adapted for linear motion in a first direction with respect to said chamber;

a second means supported by said first means and adapted for linear motion with respect thereto in a second direction;

a third means passing through the wall of said chamber, said third means being pivotally supported and engaging said second means so as to cause translation thereof in response to the pivoting of said third means;

a flexible means sealably coupled between said second means and to said chamber wall in an area surrounding the passage of said third means therethrough;

a fourth means mounted outside said chamber and adapted for linear motion in a third direction with respect to said chamber; and a fifth means mounted to said fourth means and adapted for linear motion with respect thereto in a fourth direction, said fifth means engaging said third means so as to cause pivoting thereof responsive to the position of said fifth means.

2. The means of claim 1 further comprised of drive means for independently controllably causing the translation of said fourth means with respect to said chamber and said fifth means with respect to said fourth means.

3. The means of claim 1 wherein said first and second directions are substantially orthogonal directions and said third and fourth directions are substantially orthogonal directions in a plane substantially parallel to the plane of said first and second directions.

4. The means of claim 3 wherein one of said first and second directions in parallel to one of said third and fourth directions.

5. The means of claim 1 wherein said third means is an elongated member having a spherical region at each end thereof, said second and fifth means each have a cylindrical bore cooperatively disposed and mating with one of said spherical regions.

6. The means of claim 1 wherein said flexible member is a bellows.

7. A means for providing two dimensional translation within a chamber comprising:

a first means mounted within said chamber and adapted for linear motion in a first direction with respect to said chamber;

a second means supported by said first means and adapted for linear motion with respect thereto in a second direction substantially orthogonal to said first direction;

a third means passing through the wall of said chamber, said third means being pivotally supported and engaging said second means so as to cause translation thereof in response to the pivoting of said third means;

a flexible means sealably coupled between said second means and to said chamber wall in an area surrounding the passage of said third means therethrough;

a fourth means mounted outside said chamber and adapted for linear motion in a third direction with respect to said chamber;

a fifth means mounted to said fourth means and adapted for linear motion with respect thereto in a fourth direction, substantially orthogonal to said third direction, said fifth means engaging said third means so as to cause pivoting thereof responsive to the position of said fifth means;

a first lead screw member;

a first lead screw nut member, one of said last two members being supported by said chamber and the other of said members being supported by said fourth means, said first lead screw member and said first lead screw nut member being adapted for relative rotation therebetween so as to cause translation of said fourth means with respect to said chamber;

a second lead screw member; and, a second lead screw nut member, one of said last two members being supported by said fourth means and the other of said members being supported by said fifth means, said second lead screw member and said second lead screw nut member being adapted for relative rotation therebetween so as to cause translation of said fifth means with respect to said fourth means.

8. The means of claim 7 further comprised of motor drive means for independently controllably causing relative rotation between said first lead screw member and said first lead scrw nut member, and between said second lead screw member and said second lead screw nut member.

9. The means of claim 8 wherein said first and second directions are substantially orthogonal directions and said third and fourth directions are substantially orthogonal directions in a plane substantially parallel to the plane of said first and second directions.

10. The means of claim 9 wherein one of said first and second directions is parallel to one of said third and fourth directions.

11. The means of claim 8 wherein said third means is an elongated member having a spherical region at each end thereof, said second and fifth means each have a cylindrical bore cooperatively disposed and mating with one of said spherical regions.

12. The means of claim 8 wherein said flexible member is a bellows.

13. An X-Y table for providing two dimensional translation of an object within a chamber comprising:

a first means mounted within said chamber on linear ball bearing means to provide linear motion of said first means with respect to said chamber in a first direction;

a second means supported by said first means by linear ball bearing means to provide linear motion of said second means with respect to said first means in a second direction orthogonal to said first direction;

a third means passing through the wall of said chamber, said third means being an elongate means pivotally supported approximately at its center, each of the ends of said third means having a spherical surface thereon, one end of said third means cooperatively engaging a cylindrical bore on said second means so as to cause translation of said second means in response to the pivoting of said third means;

a bellows sealably coupled between said second means and said chamber wall in an area surrounding the passage of said third means therethrough;

a fourth means mounted outside said chamber by linear ball bearing means to provide linear motion in a third direction with respect to said chamber, said third direction being substantially parallel to the plane defined by said first and second directions;

a fifth means mounted to said fourth means by linear ball bearing means to provide linear motion of said fifth means with respect to said fourth means in a fourth direction orthogonal to said third direction, said third and fourth directions defining a plane parallel to the plane defined by said first and second directions, one end of said third means cooperatively engaging a cylindrical bore on said fifth means so as to cause pivoting of said third means in response to translation of said fifth means;

a first lead screw rotationally supported by and outside said chamber, with its axis oriented in said third direction;

a first lead screw nut coupled to said third means and engaging said first lead screw;

first motor means supported by and outside said chamber, said first motor means being coupled to said first lead screw for controllably driving said first lead screw in rotation;

a second lead screw rotationally supported by said fourth means with its axis oriented in said fourth direction;

a second lead screw nut coupled to said fifth means and engaging said second lead screw; and second motor means supported by said fourth means and being coupled to said second lead screw for controllably driving said second lead screw in rotation.

* * * * *